(12) United States Patent
Matsumoto et al.

(10) Patent No.: US 10,439,478 B2
(45) Date of Patent: Oct. 8, 2019

(54) ROTOR FOR ROTARY ELECTRIC MACHINE

(71) Applicant: TOYOTA JIDOSHA KABUSHIKI KAISHA, Toyota-shi, Aichi-ken (JP)

(72) Inventors: Masashi Matsumoto, Nagoya (JP); Yasuaki Shirasaki, Nagoya (JP); Akira Nakatani, Sakai (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 482 days.

(21) Appl. No.: 15/250,263

(22) Filed: Aug. 29, 2016

(65) Prior Publication Data

US 2017/0070127 A1 Mar. 9, 2017

(30) Foreign Application Priority Data

Sep. 3, 2015 (JP) .................................. 2015-173821

(51) Int. Cl.
*H02K 1/28* (2006.01)
*H02K 15/02* (2006.01)
(Continued)

(52) U.S. Cl.
CPC ............ *H02K 15/02* (2013.01); *H02K 1/2706* (2013.01); *H02K 1/28* (2013.01); *H02K 7/003* (2013.01);
(Continued)

(58) Field of Classification Search
CPC ........ H02K 1/28; H02K 15/028; H02K 15/02; H02K 15/03; H02K 1/27; H02K 1/2706;
(Continued)

(56) References Cited

U.S. PATENT DOCUMENTS

| | | | |
|---|---|---|---|
| 2006/0017342 A1* | 1/2006 | Park | H02K 1/278 310/156.19 |
| 2009/0169328 A1 | 7/2009 | Suzuki et al. | |
| 2012/0299404 A1* | 11/2012 | Yamamoto | H02K 1/2766 310/61 |

FOREIGN PATENT DOCUMENTS

| | | |
|---|---|---|
| EP | 2034197 A1 | 3/2009 |
| FR | 2957991 A1 | 9/2011 |

(Continued)

OTHER PUBLICATIONS

Partial English translation of a communication dated Nov. 14, 2017 from the Japanese Patent Office in counterpart application No. 2015-173821.

*Primary Examiner* — Julio C. Gonzalez
*Assistant Examiner* — Alexander A Singh
(74) *Attorney, Agent, or Firm* — Sughrue Mion, PLLC

(57) ABSTRACT

A rotor includes a rotor core and a rotor shaft. The rotor shaft includes an insertion portion, an external thread portion, a key groove and a nut. The insertion portion is inserted into a cylindrical hole of the rotor core. The external thread portion extends from the insertion portion to an outer side in an axial direction of the rotor shaft. The external thread portion has a plurality of thread ridges formed on an outer peripheral surface. The key groove is provided on an outer peripheral surface of the rotor shaft so as to extend in the axial direction from the external thread portion through the insertion portion. The nut is screwed onto the external thread portion, and has a crimped portion formed so as to enter the key groove.

15 Claims, 7 Drawing Sheets

(51) Int. Cl.
*H02K 7/00* (2006.01)
*H02K 1/27* (2006.01)

(52) U.S. Cl.
CPC ............ *H02K 15/028* (2013.01); *H02K 1/27* (2013.01); *H02K 1/274* (2013.01); *H02K 1/276* (2013.01)

(58) Field of Classification Search
CPC .... H02K 1/2713; H02K 1/272; H02K 1/2726; H02K 1/2733; H02K 1/274; H02K 1/2746; H02K 1/2753; H02K 1/276; H02K 1/2766; H02K 1/2773; H02K 1/278; H02K 7/003; Y10T 29/49012
USPC .... 310/216.001, 216.004, 216.007, 216.008, 310/216.009, 216.127, 216.124, 216.132, 310/216.133, 216.134, 216.084, 216.083, 310/400–418, 156.08, 156.09; 29/598
See application file for complete search history.

(56) References Cited

FOREIGN PATENT DOCUMENTS

| GB | 881308 A | 11/1961 |
|---|---|---|
| JP | 34-8312 Y | 6/1959 |
| JP | 2002-095197 A | 3/2002 |
| JP | 2007-135371 A | 5/2007 |
| JP | 2010-209945 A | 9/2010 |
| JP | 3169882 U | 8/2011 |
| JP | 2013-122289 A | 6/2013 |
| JP | 2014-176218 A | 9/2014 |
| JP | 2015-019493 A | 1/2015 |
| JP | 2016-093015 A | 5/2016 |
| WO | 2007/144946 A1 | 12/2007 |

* cited by examiner

ROTOR FOR ROTARY ELECTRIC MACHINE

CROSS REFERENCE TO RELATED APPLICATIONS

The disclosure of Japanese Patent Application No. 2015-173821 filed on Sep. 3, 2015 including the specification, drawings and abstract is incorporated herein by reference in its entirety.

BACKGROUND

1. Field

The disclosure relates to a rotor for a rotary electric machine, and, more specifically, relates to a rotor for a rotary electric machine, which is provided with a rotor core, a rotor shaft inserted onto the rotor core, and a nut screwed onto the rotor shaft, and is used for a rotary electric machine.

2. Description of Related Art

Conventionally, as this type of rotor for a rotary electric machine, a rotor including an armature core, a shaft, and a nut is proposed (for example, see Japanese Patent Application Publication No. 2002-95197 (JP 2002-95197 A)). In the armature core, a cylindrical center hole is provided, and an inner wall forming the center hole has projections. The shaft is inserted into the center hole of the armature core. In the shaft, thread ridges, onto which the nut is screwed, and recessed grooves are formed. The recessed grooves extend in an axial direction of the shaft and have shapes that allow the projections of the armature core to enter the grooves. In this rotary electric machine, as the projections of the armature core enter the recessed grooves, the rotor is restrained from rotating with respect to the shaft. Further, as the nut is screwed onto the thread ridges in the state where the shaft is inserted into the armature core, and the nut is fastened towards the armature core, it is possible to fix the armature core to the shaft sufficiently.

In the rotor for a rotary electric machine stated above, in which the nut screwed onto the thread ridges of the rotor shaft is used to fix the rotor core to the rotor shaft, the thread ridges of the rotor shaft are required to have strength. On the other hand, grooves are commonly formed in the rotor shaft so that projecting portions on an inner peripheral surface of the rotor core enter the grooves. Further, in order to restrain a nut from loosening, it is considered that grooves are provided in the rotor shaft for crimping the nut and the nut is crimped. When such grooves are formed in the rotor shaft, there are no thread ridges of the rotor shaft in areas where the grooves are formed. Therefore, when the grooves for crimping the nut are formed separately from the grooves that receive the projecting portions on the inner peripheral surface of the rotor core in the rotor shaft, there are many areas where no thread ridges of the shaft are present. This could make it impossible to ensure sufficient strength of the thread ridges.

SUMMARY

The disclosure provides a rotor for a rotary electric machine, which ensures strength of an external thread portion where thread ridges are provided, while restraining a nut from loosening.

The rotor for a rotary electric machine according to the present disclosure may employ the following means in order to achieve the object stated above.

A rotor for a rotary electric machine according to an exemplary embodiment of the present disclosure may include: a rotor core provided with a cylindrical hole formed therethrough having a cylindrical shape, the rotor core comprising at least one projecting portion formed on in inner peripheral surface of the cylindrical hole; a rotor shaft having an insertion portion that may be inserted into the cylindrical hole of the rotor core, an external thread portion that extends from the insertion portion in an axial direction of the rotor shaft and has a plurality of thread ridges formed on an outer peripheral surface thereof, and at least one key groove into which the at least one projecting portion of the rotor core may be inserted formed in an outer peripheral surface of the rotor shaft from the external thread portion through the insertion portion; and a nut that may be screwed onto the external thread portion of the rotor shaft, the nut having at least one crimped portion formed so as to enter the at least one key groove of the rotor shaft. The rotor for the rotary electric machine may be used for a rotary electric machine.

The at least one key groove of the rotor shaft may include a first key groove and a second key groove.

The at least one crimped portion of the nut may include a first crimped portion and a second crimped portion.

The first key groove may be formed in the outer peripheral surface of the external thread portion at a position separated from the second key groove.

The first crimped portion of the nut may be formed so as to enter the first key groove of the rotor shaft, and the second crimped portion of the nut may be formed so as to enter the second key groove of the rotor shaft.

The rotor shaft may further include at least one crimping groove. The at least one crimping groove may be formed in the outer peripheral surface of the rotor shaft.

The at least one crimping groove of the rotor shaft may include a first crimping groove and a second crimping groove.

The first crimping groove of the rotor shaft may be formed in the outer peripheral surface of the external thread portion at a position overlapping the at least one key groove, and the second crimping groove of the rotor shaft may be formed in the outer peripheral surface of the external thread portion at a position separated from the at least one key groove.

The at least one crimped portion of the nut may be formed so as to enter the at least one key groove and the at least one crimping groove of the rotor shaft.

The at least one crimping groove of the rotor shaft may be shorter in length, shallower in depth, and greater in height than the at least one key groove of the rotor shaft.

The at least one key groove of the rotor shaft may include a first key groove and a second key groove formed in the outer peripheral surface of the rotor shaft at positions separated from one another. The at least one crimping groove of the rotor shaft may include a first crimping groove, a second crimping groove, a third crimping groove, and a fourth crimping groove formed in the outer peripheral surface of the rotor shaft at positions separated from one another. The first crimping groove and the third crimping groove may be formed in the outer peripheral surface of the rotor shaft at positions overlapping the first key groove and the second key groove respectively.

The at least one crimped portion of the nut may include a first crimped portion, a second crimped portion, a third crimped portion, and a fourth crimped portion formed so as to enter the first crimping groove, the second crimping groove, the third crimping groove, and the fourth crimping groove of the rotor shaft respectively.

The first crimping groove, the second crimping groove, the third crimping groove, and the fourth crimping groove of the rotor shaft may be separated by an angle of 90 degrees.

The at least one crimping groove may be formed in the external thread portion of the rotor shaft.

A rotor for a rotary electric machine according to an exemplary embodiment of the present disclosure may include: a rotor core having a cylindrical hole formed therethrough, the rotor core having at least one projecting portion formed on an inner peripheral surface of the cylindrical hole; a rotor shaft having: an insertion portion, the insertion portion being inserted into the cylindrical hole of the rotor core, an external thread portion, the external thread portion extending from the insertion portion in an axial direction of the rotor shaft, the external thread portion having a plurality of thread ridges formed on an outer peripheral surface thereof, at least one key groove, the at least one projecting portion of the rotor core being inserted into the at least one key groove, the at least one key groove being formed in an outer peripheral surface of the rotor shaft and extending in the axial direction of the rotor shaft from the external thread portion through the insertion portion, and at least one crimping groove, the at least one crimping groove being formed in the outer peripheral surface of the rotor shaft at a position overlapping the at least one key groove; and a nut screwed onto the external thread portion of the rotor shaft, the nut comprising at least one crimped portion formed so as to enter the at least one key groove and the at least one crimping groove of the rotor shaft.

The at least one key groove of the rotor shaft may include a first key groove and a second key groove formed in the outer peripheral surface of the rotor shaft at positions separated from one another. The at least one crimping groove of the rotor shaft may include a first crimping groove and a second crimping groove formed in the outer peripheral surface of the rotor shaft at positions overlapping the first key groove and the second key groove respectively.

The at least one crimped portion of the nut may include a first crimped portion and a second crimped portion formed so as to enter the first crimping groove and the second crimping groove respectively.

A nut may be secured to a rotor shaft of a rotor for a rotary electric machine according to an exemplary embodiment of the present disclosure, the rotor may include: a rotor core having a cylindrical hole formed therethrough and at least one projecting portion formed on an inner peripheral surface of the cylindrical hole, a rotor shaft comprising an external thread portion and at least one key groove formed in an outer peripheral surface of the rotor shaft, and a nut comprising at least one end portion, the method may include: inserting the rotor shaft into the cylindrical hole of the rotor core such that the at least one projecting portion is received within the at least one key groove; screwing the nut onto the external thread portion of the rotor shaft; and crimping the at least one end portion to form at least one crimped portion, the at least one crimped portion being formed so as to enter the at least one key groove of the rotor shaft.

The rotor shaft may further include at least one crimping groove formed in the outer peripheral surface of the rotor shaft at a position overlapping the at least one key groove such that the at least one crimped portion also enters the at least one crimping groove.

In the exemplary embodiments of the present disclosure described above, the projecting portion is provided in the inner peripheral surface of the rotor core, the groove for a projecting portion, which is fitted to the projecting portion, is provided on the outer peripheral surface of the rotor shaft so as to extend from the external thread portion through the insertion portion in the axis direction, and the nut is provided with the crimped portion that is crimped so as to enter the groove for a projecting portion. Thus, it is possible to crimp and fix the nut to the rotor shaft, thereby restraining the nut from loosening. Further, since it is not necessary to provide a separate groove to accommodate the crimped portion, in addition to the groove for a projecting portion, an increase in the area of the external thread portion without the thread ridge is restrained. As a result, it is possible to ensure strength of the external thread portion provided with the thread ridge, while restraining the nut from loosening.

In the foregoing exemplary rotors for a rotary electric machine according to the present disclosure, the rotor shaft may be provided with a crimping groove in the external thread portion at a position separated from the groove for a projecting portion, and the nut may be provided with a first crimped portion that is crimped so as to enter the groove for a projecting portion, and a second crimped portion that is crimped so as to enter the crimping groove. Thus, it is possible to further restrain the nut from loosening while restraining deterioration of thread strength of the external thread portion.

Further, in the exemplary rotors for a rotary electric machine according to the present disclosure, the rotor shaft may be provided with a crimping groove at a position that overlaps the groove for a projecting portion in the external thread portion, and the nut may be provided with a crimped portion crimped so as to enter the crimping groove and the groove for a projecting portion.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
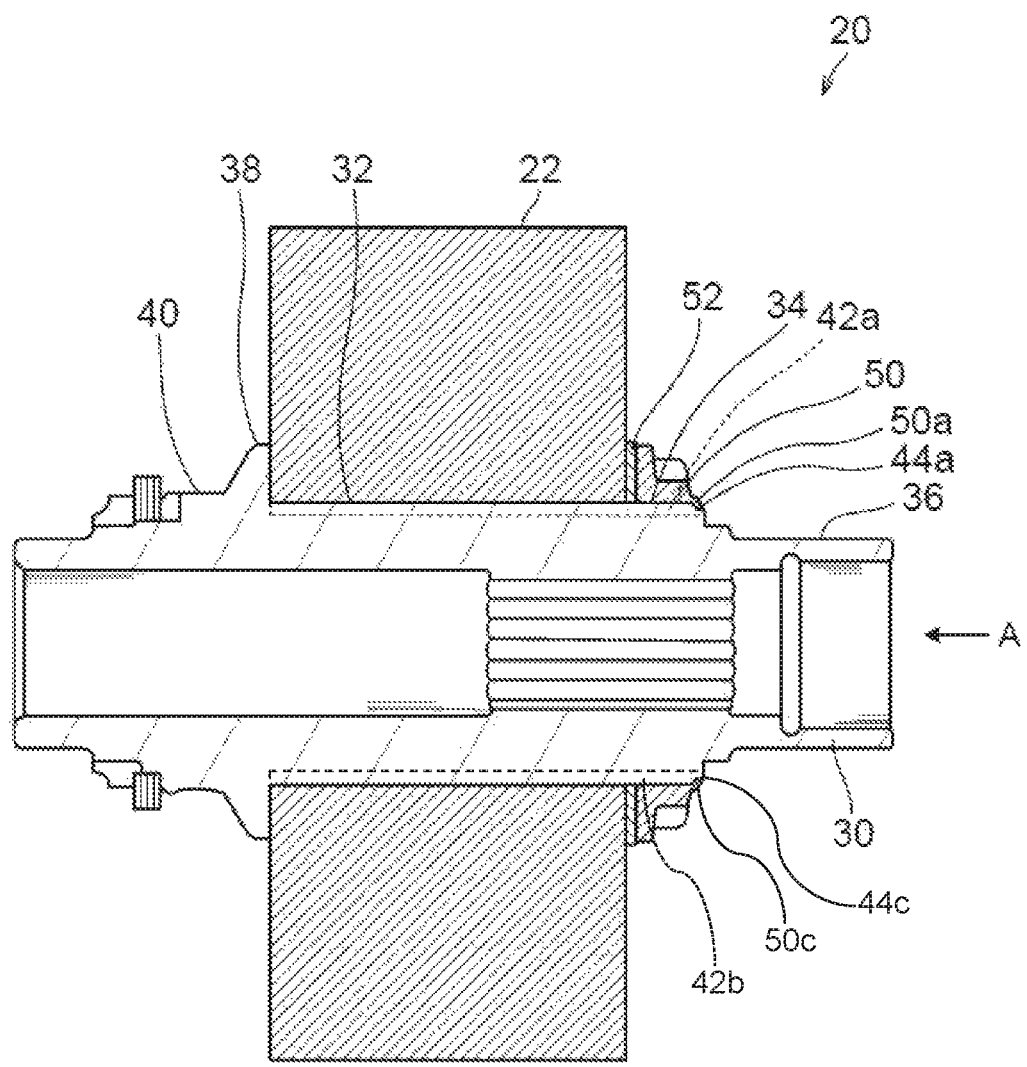
FIG. 1 is a cross-sectional view depicting a structure of an exemplary rotor of the present disclosure.
Figure 2:
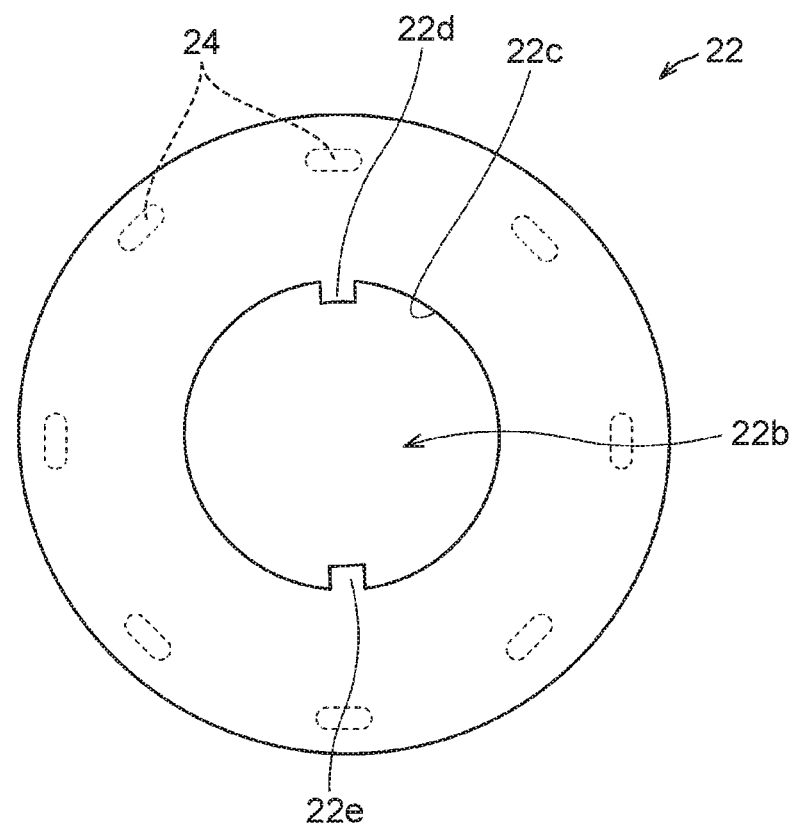
FIG. 2 is a side view depicting a state of a rotor core as seen in a direction A of FIG. 1.
Figure 3:
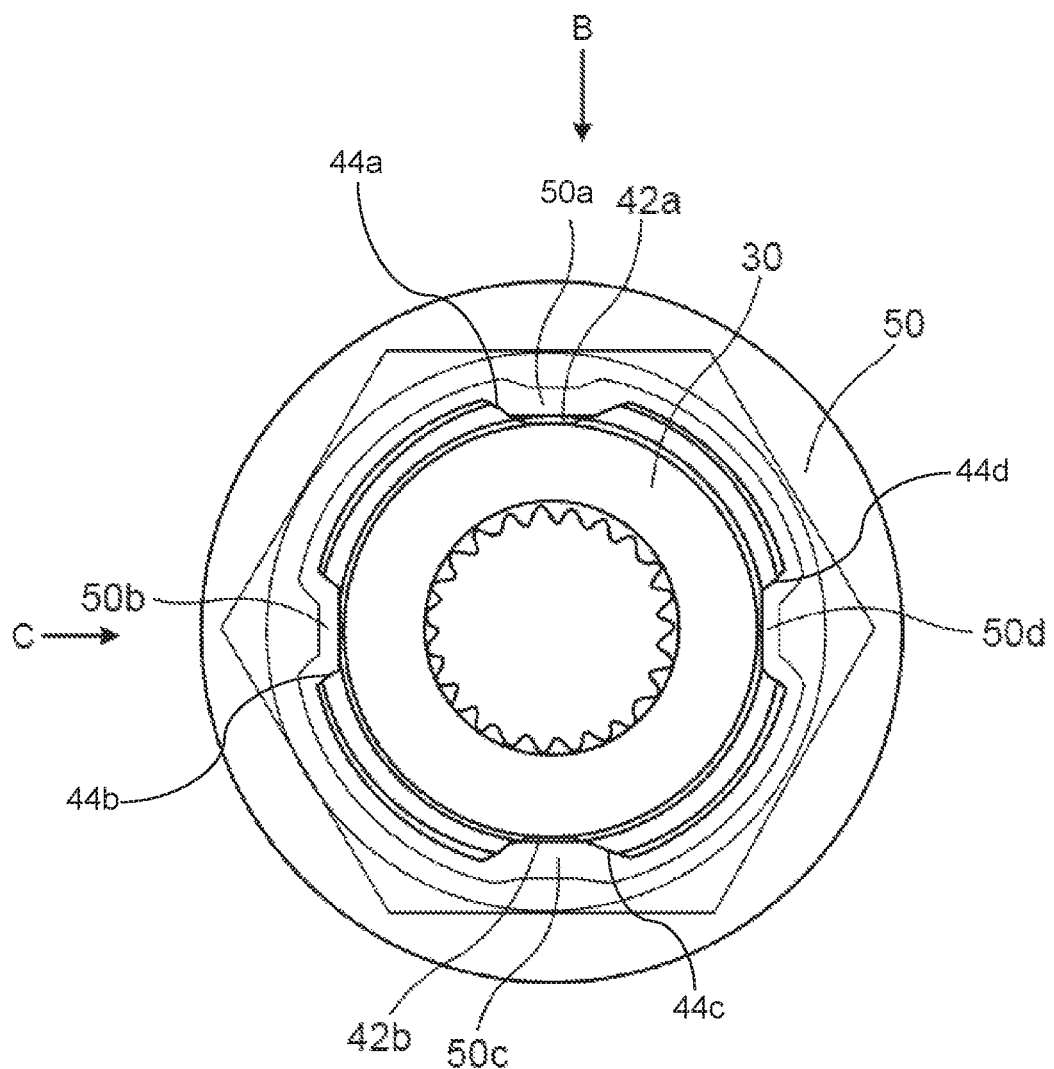
FIG. 3 is a side view depicting states of a rotor shaft and a nut as seen in the direction A of FIG. 1.
Figure 4:
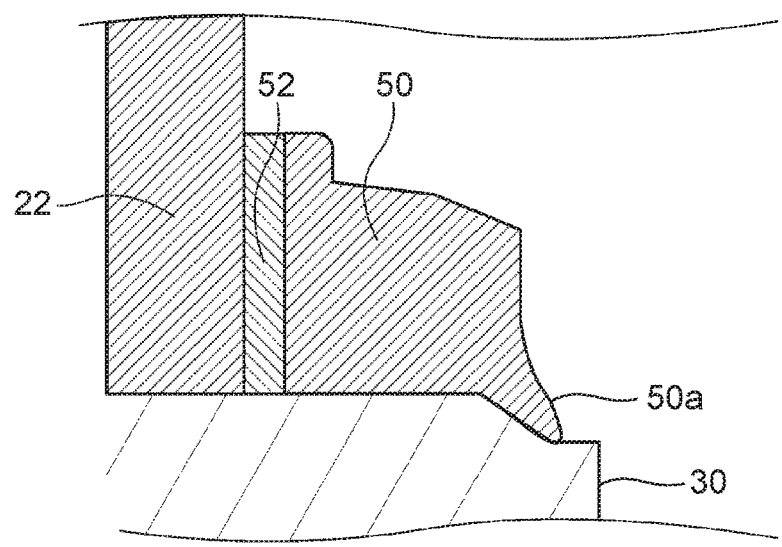
FIG. 4 is an enlarged cross-sectional view in which a main portion of the rotor is enlarged.
Figure 5:
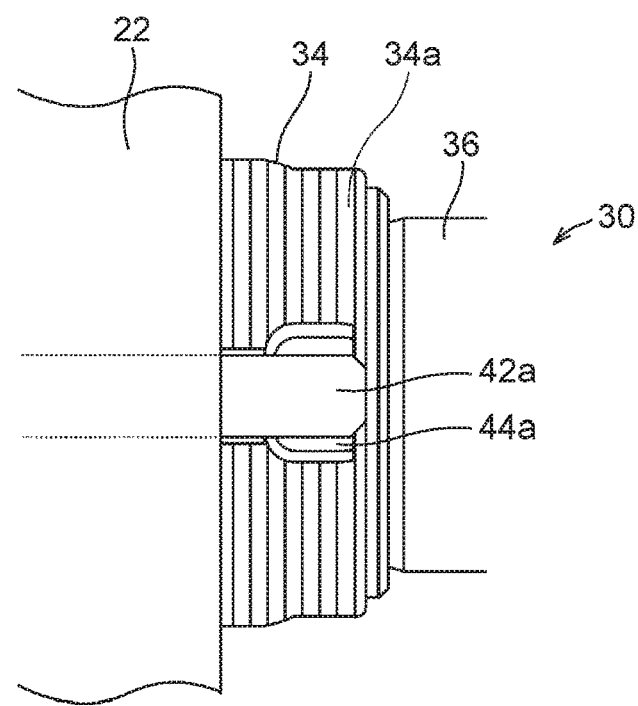
FIG. 5 is an enlarged side view in which a main portion of the rotor shaft is enlarged as seen in a direction B of FIG. 3.
Figure 6:
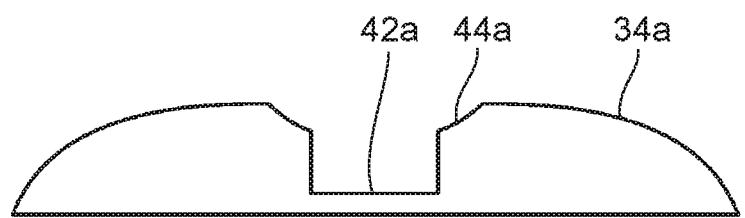
FIG. 6 is a detailed plan view depicting depths of a key groove and a crimping groove.
Figure 7:
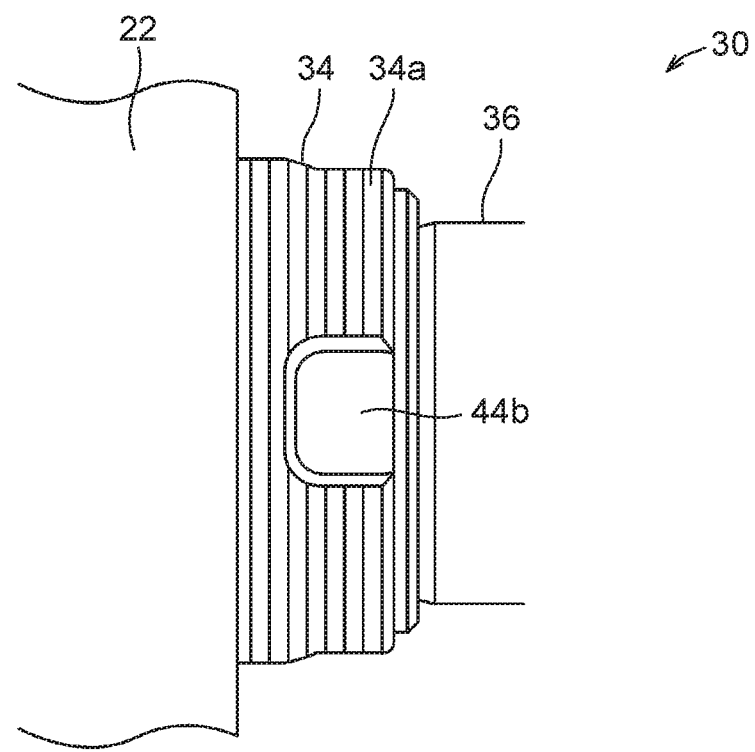
FIG. 7 is an enlarged side view in which the main portion of the rotor shaft is enlarged as seen in a direction C of FIG. 3.
Figure 8:
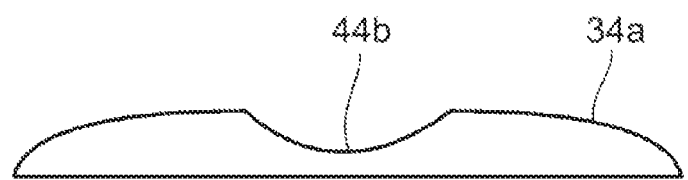
FIG. 8 is a detailed plan view depicting a depth of a crimping groove.

FIG. 1 is a cross-sectional view depicting a structure of a rotor 20 as an exemplary embodiment of a rotor for a rotary electric machine according to the present disclosure. FIG. 2 is a side view depicting a state of a rotor core 22 as seen in a direction A FIG. 1. FIG. 3 is a side view depicting states of a rotor shaft 30 and a nut 50 as seen in the direction A of FIG. 1. FIG. 4 is an enlarged cross-sectional view in which a main portion of the rotor 20 is enlarged. FIG. 5 is an enlarged side view in which a main portion of the rotor shaft 30 is enlarged as seen in a direction B of FIG. 3. FIG. 6 is a detailed plan view depicting depths of a key groove 42a and a crimping groove 44a. FIG. 7 is an enlarged side view in which the main portion of the rotor shaft 30 is enlarged as seen in a direction C of FIG. 3. FIG. 8 is a detailed plan view depicting a depth of a crimping groove 44b. The rotor 20 is used as a motor together with a stator.

As shown in FIG. 1 and FIG. 2, the rotor 20 is provided with a cylindrical rotor core 22, a plurality of permanent magnets 24 inserted into a plurality of slots, respectively, of the rotor core 22, the rotor shaft 30 on which the rotor core 22 is mounted, the nut 50 used to mount the rotor core 22 on the rotor shaft 30, and a washer 52 inserted between the nut 50 and the rotor core 22.

As shown in FIG. 1 and FIG. 2, the rotor core 22 may be structured by laminating a plurality of annular rotor members that are formed by punching a non-oriented electromagnetic steel sheet, and a cylindrical hole 22b having a generally cylindrical shape is provided in the center portion of the rotor core 22. Keys 22d, 22e are provided in an inner peripheral surface 22c of the rotor core 22. The keys 22d, 22e are formed as projecting portions that come into contact with the rotor shaft 30. The keys 22d, 22e may be arranged at an angle of 180 degrees relative to one another in the circumferential direction of the cylindrical hole 22b.

As shown in FIG. 1 and FIG. 3~FIG. 8, the rotor shaft 30 includes an insertion portion 32 inserted into the cylindrical hole 22b of the rotor core 22; an external thread portion 34, which extends from the insertion portion 32 in a direction opposite to the direction A of FIG. 1 and has thread ridges 34a onto which the nut 50 is screwed, the thread ridges 34a being provided on an outer peripheral surface of the external thread portion 34; an end portion 36 extending from the external thread portion 34 in the direction opposite to the direction A of FIG. 1; a contact portion 38, which extends from the insertion portion 32 in the direction A of FIG. 1 and comes into contact with an end surface of the rotor core 22; and an end portion 40 extending from the contact portion 38 in the direction A of FIG. 1. On an outer peripheral surface of the rotor shaft 30, key grooves 42a, 42b are provided from the external thread portion 34 through the insertion portion 32. The keys 22d, 22e of the rotor core 22 are inserted into the key grooves 42a, 42b, respectively. Thus, rotation of the rotor core 22 with respect to the rotor shaft 30 is restricted. Crimping grooves 44a~44d are provided in the external thread portion 34. As shown in FIG. 1, FIG. 3, and FIG. 5, the crimping groove 44a is formed at a position overlapping the key groove 42a. Similar to the crimping groove 44a, the crimping groove 44c is formed at a position overlapping the key groove 42b. The crimping grooves 44b, 44d are arranged at positions separated from the key grooves 42a, 42b. For example, the crimping grooves 44b, 44d may be arranged at angles of 90 degrees with respect to the neighboring crimping grooves 44a, 44c in the circumferential direction of the rotor shaft 30. In short, the crimping grooves 44a~44d may be arranged at an angle of 90 degrees from each other in the circumferential direction of the rotor shaft 30. The crimping grooves 44a~44d are formed such that lengths of the crimping grooves 44a~44d in a horizontal direction of FIG. 1 are smaller than lengths of the key grooves 42a, 42b, such that depths of the crimping grooves 44a~44d are shallower than depths of the key grooves 42a, 42b, and such that heights of the crimping grooves 44a~44d in a vertical direction of FIG. 5 are larger than heights of the key grooves 42a, 42b.

Figure 9:
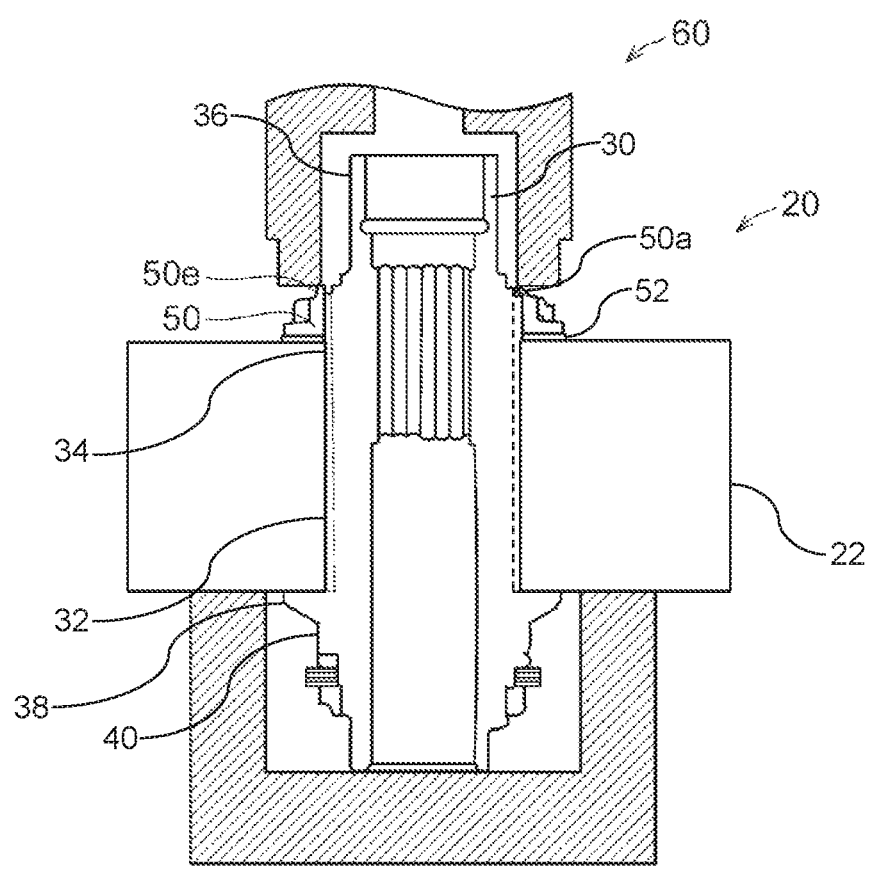
FIG. 9 is a cross-sectional view depicting an operation in which a crimped portion is formed.
Figure 10:
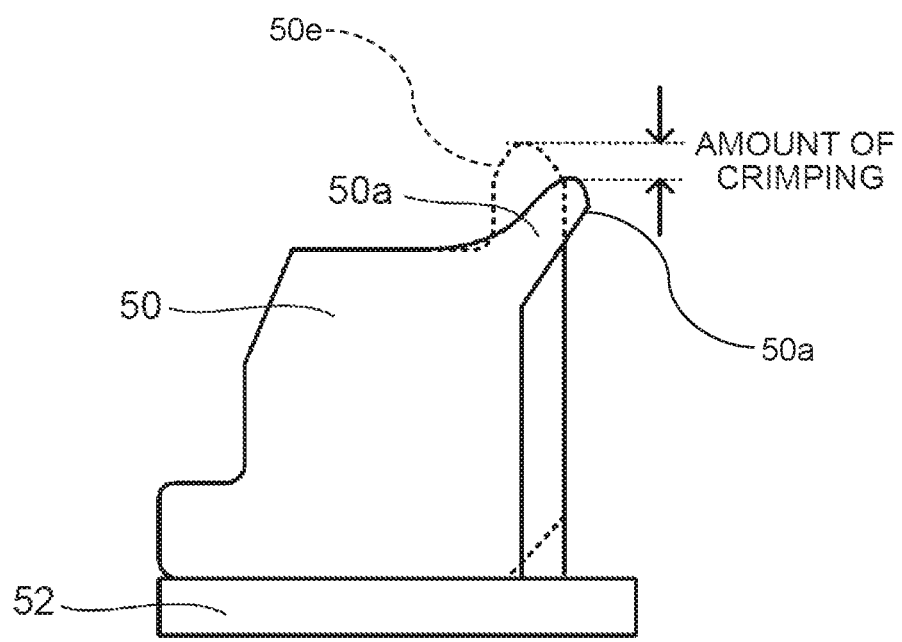
FIG. 10 is a cross-sectional view depicting a state of the nut before and after crimping.

As shown in FIG. 1, FIG. 3, and FIG. 4, the nut 50 is screwed onto the thread ridges 34a of the external thread portion 34 of the rotor shaft 30. The nut 50 functions in combination with the contact portion 38 to press and support the rotor core 22 through the washer 52, thereby restricting movements of the rotor core 22 with respect to the rotor shaft 30 in an axial direction of the rotor core 22. The nut 50 has crimped portions 50a~50d that are crimped so as to enter the crimping grooves 44a~44d, respectively. The crimping grooves 44a, 44c are formed at positions that overlap the key grooves 42a, 42b, respectively. Therefore, the crimped portions 50a, 50c enter portions of the key grooves 42a, 42b, respectively. FIG. 9 is a cross-sectional view depicting an operation in which the crimped portion 50a is formed. FIG. 10 is a cross-sectional view depicting a state of the nut 50 before and after crimping. In FIG. 10, the broken line shows a state of an end portion 50e of the nut 50 before crimping, and the solid line shows a state of the nut 50 after the end portion 50e is crimped to form the crimped portion 50a. As shown in FIG. 9 and FIG. 10, the crimped portions 50a~50d are formed by pressing end portions (for example, the end portion 50e and so on) of the nut 50 at locations corresponding to the crimping grooves 44a~44b by passing one or more crimping tools 60 over the end portion 36 of the rotor shaft 30 in a state where the nut 50 is fastened to the rotor shaft 30, such that the end portions of the nut 50 are crimped to form crimped portions 50a~50d which enter the crimping grooves 44a~44d, respectively. In this manner, the nut 50 is crimped and fixed to the rotor shaft 30. By this crimping fixation, loosening of the nut 50 is restrained.

In the rotor 20 according to the exemplary embodiment structured as described above, the crimping grooves 44b, 44d are formed at positions separated from the key grooves 42a, 42b, and the crimped portions 50b, 50d are formed in the nut 50 and crimped so as to enter the crimping grooves 44b, 44d, respectively. Therefore, compared to a rotor in which the nut 50 is crimped and fixed to the rotor shaft 30 only by the crimped portions 50a, 50c, it is possible to prevent loosening of the nut 50 further.

The crimping grooves 44a, 44c are formed in the external thread portion 34 at positions which overlap the key grooves 42a, 42b, respectively. Therefore, compared to a rotor in which all crimping grooves are formed at positions separated from the key grooves 42a, 42b, it is possible to allow more thread ridges to remain. Thus, it is possible to restrain deterioration of strength of the external thread portion 34.

In the rotor for a rotary electric machine according to the exemplary embodiment described so far, the crimping grooves 44a, 44c are formed in the external thread portion at positions that overlap the key grooves 42a, 42b, the crimping grooves 44b, 44d are formed in the external thread portion at positions separated from the key grooves 42a, 42b, and the crimped portions 50a~50d are formed in nut 50. Thus, it is possible to restrain deterioration of strength of the external thread portion 34 while restraining the nut 50 from loosening.

In the rotor 20 according to the exemplary embodiment described above, the crimping grooves 44a~44b have smaller depths than those of the key grooves 42a, 42b. However, the depths of the crimping grooves 44a~44b may be the same as those of the key grooves 42a, 42b.

In the rotor 20 according to the exemplary embodiment described above, the crimping grooves 44a, 44c are provided at positions that overlap the key grooves 42a, 42b.

However, the crimping grooves 44a, 44c may not be provided, and the rotor may have a shape in which the crimped portions 50a, 50c of the nut 50 enter the key grooves 42a, 42b, respectively.

In the exemplary embodiment described above, the rotor core 22 is an example of a "rotor core", and the rotor shaft 30 is an example of a "rotor shaft", and the nut 50 is an example of a "nut".

The present disclosure is applicable to a manufacturing industry of a rotor for a rotary electric machine, and so on.

In the rotor for a rotary electric machine, the rotor shaft 30 is provided with the external thread portion 34 in which the thread ridges 34a, onto which the nut 50 is screwed, are provided in the outer peripheral surface of the external thread portion 34. Also, the crimping groove 44a is formed at a position that overlaps the key groove 42a of the external thread portion 34. Then, the crimped portion 50a is provided in the nut 50 and crimped so as to enter the crimping groove 44a, and the nut 50 is crimped and fixed to the rotor shaft 30 by the crimped portion 50a. This makes it possible to restrain the nut 50 from loosening. Moreover, compared to a rotor in which a crimping groove is formed at a position different from a key groove, more thread ridges are allowed to remain, thereby restraining deterioration of strength of an external thread portion.

What is claimed is:

1. A rotor for a rotary electric machine, the rotor comprising:
   a rotor core having a cylindrical hole formed therethrough, the rotor core comprising at least one projecting portion formed on an inner peripheral surface of the cylindrical hole;
   a rotor shaft comprising:
      an insertion portion that is inserted into the cylindrical hole of the rotor core,
      an external thread portion that extends from the insertion portion in an axial direction of the rotor shaft, the external thread portion having a plurality of thread ridges formed on an outer peripheral surface thereof, and
      at least one key groove into which the at least one projecting portion of the rotor core is inserted, the at least one key groove being formed in an outer peripheral surface of the rotor shaft and extending in the axial direction of the rotor shaft from the external thread portion through the insertion portion; and
   a nut screwed onto the external thread portion of the rotor shaft, the nut comprising at least one crimped portion formed so as to enter the at least one key groove of the rotor shaft, wherein
   the rotor shaft further comprises at least one crimping groove at a position overlapping with the at least one key groove, the at least one crimping groove being formed in the outer peripheral surface of the rotor shaft, and wherein the at least one crimping groove is wider than the at least one key groove, and wherein the at least one key groove is longer than the at least one crimping groove.

2. The rotor according to claim 1, wherein
the at least one key groove of the rotor shaft comprises a first key groove and a second key groove.

3. The rotor according to claim 2, wherein
the at least one crimped portion of the nut comprises a first crimped portion and a second crimped portion.

4. The rotor according to claim 3, wherein
the first key groove is formed in the outer peripheral surface of the external thread portion at a position separated from the second key groove.

5. The rotor according to claim 3, wherein
the first crimped portion of the nut is formed so as to enter the first key groove of the rotor shaft, and
the second crimped portion of the nut is formed so as to enter the second key groove of the rotor shaft.

6. The rotor according to claim 1, wherein
the at least one crimping groove of the rotor shaft comprises a first crimping groove and a second crimping groove.

7. The rotor according to claim 6, wherein
the first crimping groove of the rotor shaft overlaps the at least one key groove, and
the second crimping groove of the rotor shaft is formed in the outer peripheral surface of the external thread portion at a position separated from the at least one key groove.

8. The rotor according to claim 6, wherein
the at least one crimped portion of the nut comprises a first crimped portion and a second crimped portion formed so as to enter the first crimping groove and the second crimping groove respectively.

9. The rotor according to claim 1, wherein
the at least one crimped portion of the nut is formed so as to enter the at least one key groove and the at least one crimping groove of the rotor shaft.

10. The rotor according to claim 1, wherein
the at least one crimping groove of the rotor shaft is shallower in depth, and greater in height than the at least one key groove of the rotor shaft.

11. The rotor according to claim 1, wherein
the at least one key groove of the rotor shaft comprises a first key groove and a second key groove formed in the outer peripheral surface of the rotor shaft at positions separated from one another, and
the at least one crimping groove of the rotor shaft comprises a first crimping groove, a second crimping groove, a third crimping groove, and a fourth crimping groove formed in the outer peripheral surface of the rotor shaft at positions separated from one another, the first crimping groove and the third crimping groove being formed in the outer peripheral surface of the rotor shaft at positions overlapping the first key groove and the second key groove respectively.

12. The rotor according to claim 11, wherein
the at least one crimped portion of the nut comprises a first crimped portion, a second crimped portion, a third crimped portion, and a fourth crimped portion formed so as to enter the first crimping groove, the second crimping groove, the third crimping groove, and the fourth crimping groove of the rotor shaft respectively.

13. The rotor according to claim 11, wherein
the first crimping groove, the second crimping groove, the third crimping groove, and the fourth crimping groove of the rotor shaft are separated by an angle of 90 degrees.

14. The rotor according to claim 1, wherein
the at least one crimping groove is formed in the external thread portion of the rotor shaft.

15. A method of securing a nut to a rotor shaft of a rotor for a rotary electric machine, the rotor comprising a rotor core having a cylindrical hole formed therethrough and at least one projecting portion formed on an inner peripheral surface of the cylindrical hole, a rotor shaft comprising an external thread portion and at least one key groove formed in an outer peripheral surface of the rotor shaft, and a nut comprising at least one end portion, the method comprising:
- inserting the rotor shaft into the cylindrical hole of the rotor core such that the at least one projecting portion is received within the at least one key groove;
- screwing the nut onto the external thread portion of the rotor shaft; and
- crimping the at least one end portion to form at least one crimped portion, the at least one crimped portion being formed so as to enter the at least one key groove of the rotor shaft,
- wherein the rotor shaft further comprises at least one crimping groove formed in the outer peripheral surface of the rotor shaft at a position overlapping the at least one key groove such that the at least one crimped portion also enters the at least one crimping groove, wherein the at least one crimping groove is wider than the at least one key groove, and wherein the at least one key groove is longer than the at least one crimping groove.

* * * * *